Figure 1:
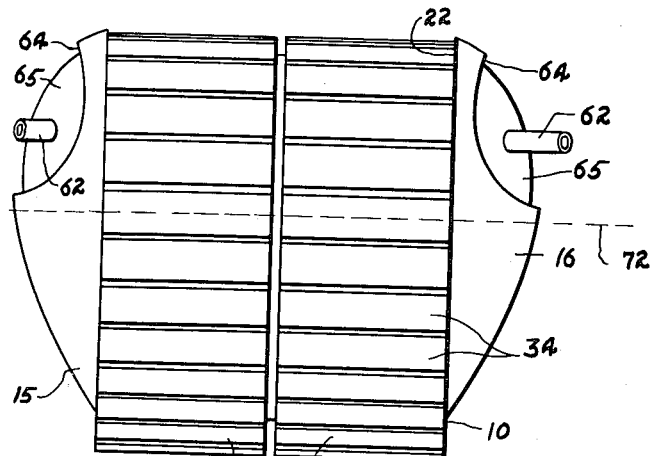

July 31, 1956

P. E. HURTHIG 2,756,830

AMPHIBIOUS VEHICLE AND ENDLESS PROPELLING BELTS THEREFOR

Filed Jan. 26, 1953

2 Sheets-Sheet 1

INVENTOR
PETER E. HURTHIG
BY
Fetherstonhaugh & Co.
ATTORNEYS

July 31, 1956  P. E. HURTHIG  2,756,830
AMPHIBIOUS VEHICLE AND ENDLESS PROPELLING BELTS THEREFOR
Filed Jan. 26, 1953  2 Sheets-Sheet 2

INVENTOR
PETER E. HURTHIG
BY
Fetherstonhaugh & Co.
ATTORNEYS

United States Patent Office 2,756,830
Patented July 31, 1956

2,756,830

AMPHIBIOUS VEHICLE AND ENDLESS PROPELLING BELTS THEREFOR

Peter Ernfrid Hurthig, Vancouver, British Columbia, Canada, assignor of one-half to Ernest David Wesley Maxwell, Vancouver, British Columbia, Canada Application January 26, 1953, Serial No. 333,080

5 Claims. (Cl. 180—9.1)

This invention relates to improvements in amphibious vehicles which may be used for war or other purposes.

The vehicle is particularly designed to be used as a tank for war purposes, but it is to be understood that it may be constructed for different peaceful uses. The tanks that have been in use up to the present time have been very cumbersome, comparatively slow in movement, and greatly hampered in operation by snow, swamp land, and water. Furthermore, the known tanks may be stopped by comparatively low obstacles.

It is the main object of the present invention to provide a vehicle or tank which will afford the occupants more protection than the prior tanks, and which is capable of travelling at much higher speeds, of moving over much larger obstacles, and of freely operating in swamp, muskeg, snow and water.

A further object is the provision of a tank which may be made completely water-tight below the level at which it would float.

A further object is the provision of a tank having one or more endless propelling belts or treads which may be so constructed to act as armour for the tank.

Yet another object is the provision of a tank constructed so as to afford complete protection for the propelling belts or treads thereof from the sides.

A further object is the provision of a tank having very few moving parts exposed to gun-fire.

This vehicle or tank comprises a housing having a peripheral wall around a horizontal axis extending transversely thereof. This housing preferably is cylindrical or substantially cylindrical in shape, and it includes means for closing the sides or ends thereof. The closing means may be in the form of substantially semi-spherical blisters which protrude from the ends of the cylinder. One or more endless propelling belts are movably mounted on and extend around the housing in a plane normal to the axis thereof. A suitable power unit is provided in the housing along with means for operatively connecting said unit to the belt or belts to move them around the housing. Means is provided for stabilizing the housing during the movement of the propelling belt or belts. This may be in the form of a relatively great weight positioned at the bottom of the housing, said weight being made up partly or wholly by equipment of the vehicle, or a gyroscope may be installed for this purpose. One or more guns may project from the blisters, and one or more normally closed hatches may be provided therein.

Figure 2:
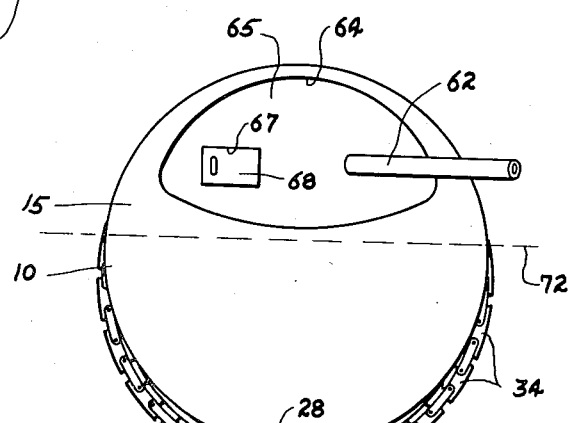
Figure 3:
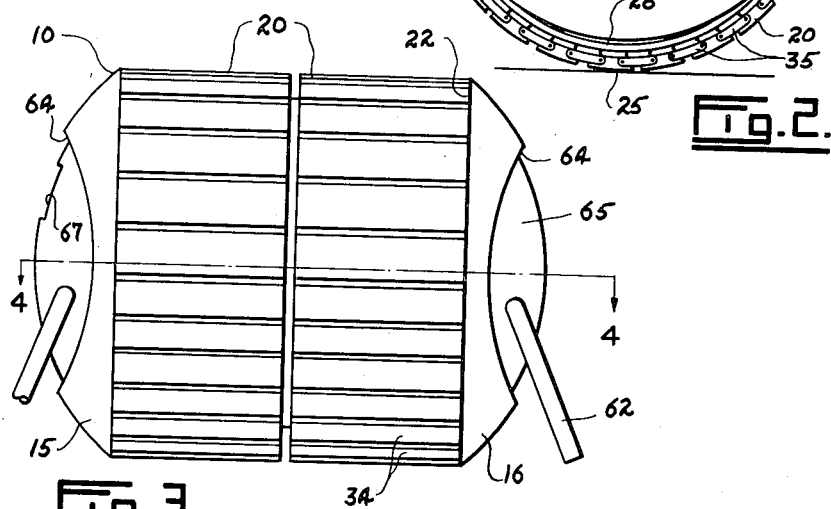
Figure 4:
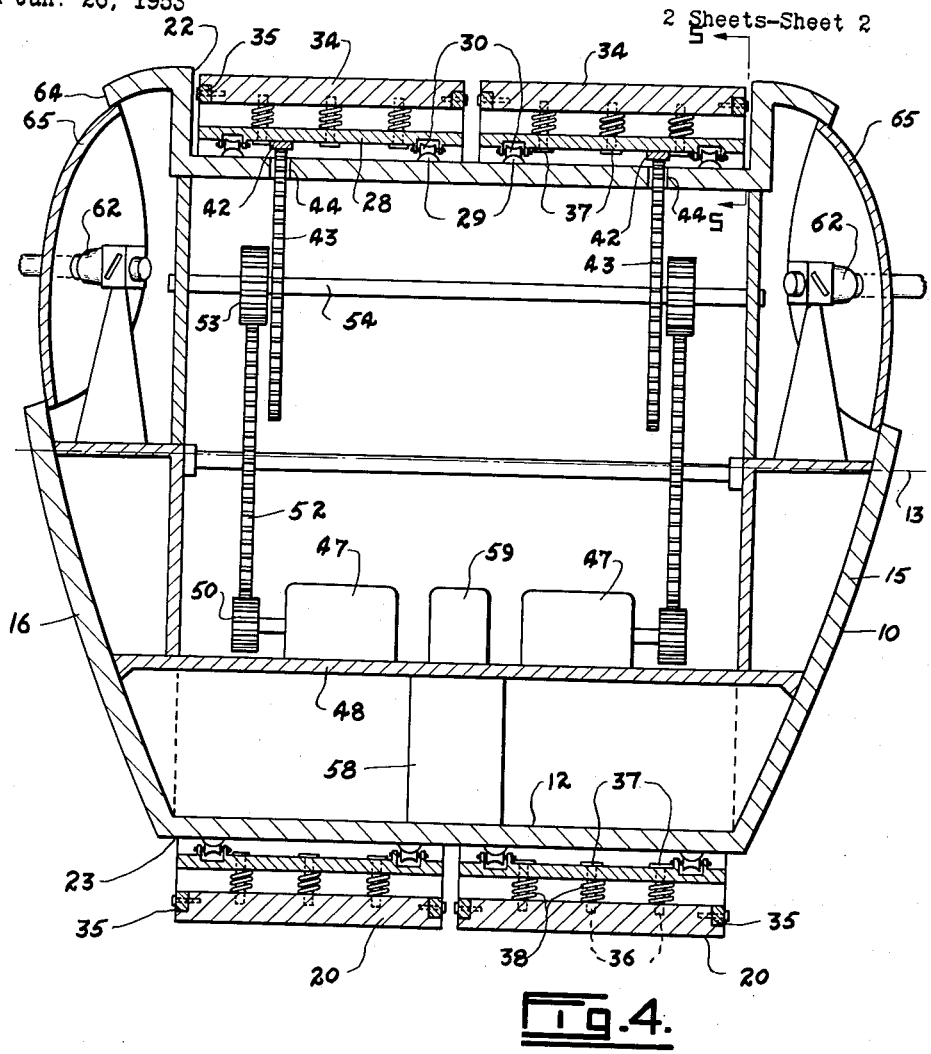
Figure 5:
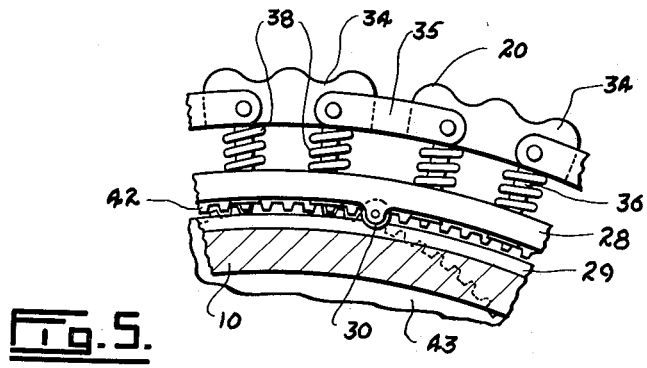

An example of this invention is illustrated in the accompanying drawings, in which, Figure 1 is a front elevation of the vehicle, Figure 2 is a side elevation thereof, Figure 3 is a top plan, Figure 4 is an enlarged diagrammatic cross section taken on the line 4—4 of Figure 3, and Figure 5 is an enlarged fragmentary section taken on the line 5—5 of Figure 4.

Referring to the drawings, 10 is a housing of any desired construction. If the vehicle is intended to be used as a tank, the housing would be constructed of suitable heavy armour material. This housing has a curved peripheral wall 12 extending around a horizontal axis indicated by the broken line 13 in Figure 4. The housing is preferably in cylindrical form which in vertical cross section may be round or oval. In the illustrated example, the housing is substantially circular in cross section. Suitable means are provided for closing the ends of the housing which actually form the sides of the vehicle. It is preferable to close said ends by substantially semi-spherical blisters 15 and 16 which would also be formed of armour plate if the vehicle is intended for war purposes.

At least one endless propelling belt 20 is movably mounted on and extends around the housing 10 in a plane normal to the axis 13 thereof, two of such belts being shown in the illustrated form of the invention. The belts may be completely outside of the housing, but it is preferable to fit them into a channel 22 formed in and extending around a substantial portion of the peripheral wall 12. This channel is of such depth at the top of the housing that the belts are completely contained therein at this point, and said channel gradually gets shallower from this point in the two opposite directions to the bottom of the tank where it is very shallow or practically disappears as indicated at 23 in Figure 4. By examining Figure 2 it will be seen that the propelling belts are completely encased within the housing channel around the greater part thereof, but are exposed laterally at the bottom of the tank as indicated at 25 so that said belts rest upon the ground and support the housing above the latter.

Each belt may be of any desired construction, but it is preferable in the form of treads somewhat similar to ordinary tank treads. However, each belt includes an endless flexible band 28 which extends around the housing within the channel 22. Suitable means is provided for preventing lateral movement of the band. For this purpose, a pair of tracks 29 may extend around the housing, and the band provided with a plurality of rollers 30 on its inner surface riding on these tracks. The outer surface of each track may be curved in cross section, in which case the rollers are correspondingly curved to fit over it. The outer part of the propelling belt may be formed of a plurality of treads 34 which are pivotally connected to each other by means of side links 35, see Figure 6. Each tread may be spaced outwardly from the band 28 in any convenient manner. In this example, the treads are provided with bolts 36 extending inwardly therefrom freely through the band and having heads 37 at their inner ends. Compression springs 38 on these bolts between the band and the treads resiliently hold the latter outwardly from the former.

The propelling belts may be moved around the housing in any desired manner. In this example, each band 28 has an internal gear 42 extending around its inner surface which meshes with a gear 43 mounted in the housing 10 and projecting through a slot 44 formed in the top thereof or in the bottom of the channel 22 at the top of said housing. Suitable means is provided for rotating this gear. A power unit 47, such as a gasoline or diesel engine, is mounted on a floor 48 within the housing and is operatively connected to the gear 43. This may be done by means of a pinion 50 fixed to the motor shaft 51 and meshing with another gear 52 which, in turn, meshes with a smaller gear 53 fixed to a short shaft 54 upon which the gear 43 is fixedly mounted. One power unit 47 may be used for both propelling belts, but as shown, a separate unit 47 is preferred for each belt. The vehicle is steered or controlled by altering the speed of one belt relative to the other.

If the housing 10 is circular or practically circular in cross section, the bands 28 and internal gears 42 may be formed without a break. However, if the contour of the housing includes a fairly sharp curve, which would be the case in a substantially tear-drop design, it would be necessary to form the bands and internal gears in sections hingedly connected to each other.

It is necessary to provide means for stabilizing the housing 10 while the propelling belts are moving therearound. This may be accomplished by providing sufficient weight below the centre of gravity of the housing to keep it in an upright position. The weight may be partly or completely formed by machinery and equipment in the housing, or a special dead weight may be provided for this purpose. It is, however, preferred to provide a gyroscope as diagrammatically illustrated at 58. The power for operating the gyroscope may be supplied by one of the units 47, or a separate power unit 59 may be provided.

Any suitable armament may be provided for the tank. In this example, cannons 62 project outwardly from the blisters 15 and 16. Each cannon projects through an opening 64 in its blister and has a shield 65 which moves with it and keeps the opening closed at all times. Other slots, not shown, may be provided through which smaller arms may be fired.

Slots may be provided in one or both blisters for the driver of the vehicle, or a suitable periscope arrangement may be provided for this purpose.

Access may be gained to the housing 10 in any convenient manner. For example, a hatchway 67 may be provided in one of the shields 65, said hatchway being normally closed by a sliding hatch 68. A suitable ladder may be provided on the outside of the blister, or one may be used which may be drawn into the housing after the occupants get into it.

This vehicle or tank is actually in the form of a large wheel having propelling belts or treads around the periphery thereof. As a result of this, it is possible to gain very high speeds with a reasonable amount of power. The vehicle will ride over any obstacles the tops of which are below the axis thereof. As this wheel is much larger than the wheels around which the treads of ordinary tanks travel, it will ride over much higher obstacles. The outer surfaces of the blisters and the treads are exposed to gunfire, but these surfaces are curved so that there is a great possibility that most shells will be deflected. The treads of the propelling belts are exposed to gun-fire only from directly in front of, above or behind the vehicle, thus reducing greatly the possibility of being hit. In addition to this, the moving treads will deflect a large percentage of the shells hitting them. In fact, the treads provide substantial armour for the vehicle housing, and they can be made very heavy for this purpose.

In Figures 1 and 2, the broken line 72 indicates the level of water in which the tank or vehicle may float. The only openings into the housing are at the top thereof so that said housing may be made completely water-tight. This is the big advantage when it is desired to land the tanks from vessels off shore, or for crossing rivers or marshy land. The treads of the operating belts provide surfaces for propelling the vehicle through snow, sand, muskeg, water and swamp land.

While two propelling belts have been shown in a single channel extending around the housing, it is obvious that each belt may be in a separate channel of its own, said channels being spaced from each other in the peripheral wall of the housing.

What I claim as my invention is:

1. An amphibious vehicle comprising a housing having a curved peripheral wall around a horizontal axis extending transversely thereof, means completely closing the sides of the housing, a channel formed in and extending around a substantial portion of the peripheral wall, said channel being practically the same width as the housing and opening outwardly therefrom in a radial direction, a pair of endless propelling belts movably mounted side by side in the channel and extending around the housing, said belts covering the channel bottom, a power unit in the housing, and means operatively connecting the power unit to the belts to move the latter around the housing.

2. An amphibious vehicle comprising a housing having a curved peripheral wall around a horizontal axis extending transversely thereof, semi-spherical blisters completely closing the opposite sides of the housing, a pair of endless propelling belts movably mounted on and extending around the housing in a plane normal to the axis thereof; each belt consisting of an endless flexible band, and a plurality of treads pivotally connected to each other connected to and spaced outwardly from the band, said treads extending completely around the band; a power unit in the housing, and means operatively connecting the power unit to the belts to move the latter around the housing.

3. An amphibious vehicle comprising a housing having a curved peripheral wall around a horizontal axis extending transversely thereof, semi-spherical blisters completely closing the opposite sides of the housing, a pair of endless propelling belts movably mounted on and extending around the housing in a plane normal to the axis thereof; each belt consisting of an endless flexible band, a plurality of treads pivotally connected to each other extending completely around the band, means resiliently connecting the treads to and spacing them outwardly from the band, and means preventing lateral movement of the band; a power unit in the housing, and means operatively connecting the power unit to the belts to move the latter around the housing.

4. An amphibious vehicle comprising a completely closed housing having a curved peripheral wall around a horizontal axis extending transversely thereof, a channel formed in and extending around a substantial portion of the peripheral wall, said channel being practically the same width as the housing and opening outwardly therefrom in a radial direction, a pair of endless propelling belts movably mounted side by side in the channel and extending around the housing, said belts covering the channel bottom, said channel being deep enough at the top of the housing to accommodate the entire belts and gradually getting shallower from this point in the two opposite directions to the bottom thereof, said belts projecting outwardly beyond the peripheral wall of the housing at the bottom thereof to provide traction means therefor, a power unit in the housing, and means operatively connecting the power unit to the belts at the top of the housing to move said belts therearound.

5. An amphibious vehicle comprising a completely closed housing having a curved peripheral wall around a horizontal axis extending transversely thereof, a channel formed in and extending around a substantial portion of the peripheral wall, said channel being practically the same width as the housing and opening outwardly therefrom in a radial direction, a pair of endless propelling belts movably mounted on and extending around the housing in a plane normal to the axis thereof; each belt consisting of an endless flexible band, a plurality of treads pivotally connected to each other extending completely around the band, means resiliently connecting the treads to and spacing them outwardly from the band, and means preventing lateral movement of the band; said channel being deep enough at the top of the housing to accommodate the entire belts and gradually getting shallower from this point in the two opposite directions to the bottom thereof, said belts projecting outwardly beyond the peripheral wall of the housing at the bottom thereof to provide traction means therefor, a power unit in the housing, and means operatively connecting the power unit to the belts at the top of the housing to move said belts therearound.

References Cited in the file of this patent

UNITED STATES PATENTS

| | | |
|---|---|---|
| 1,031,098 | Stock | July 2, 1912 |
| 1,106,182 | Beard | Aug. 4, 1914 |
| 1,313,095 | Lauterbur | Aug. 12, 1919 |
| 1,357,571 | Knepper | Nov. 2, 1920 |
| 1,374,761 | Pomilio | Apr. 12, 1921 |
| 2,072,611 | Von Kories | Mar. 2, 1937 |
| 2,320,331 | Jenewein et al. | May 25, 1943 |
| 2,415,056 | Wheeler | Jan. 28, 1947 |